US011400910B2

(12) United States Patent
Fujimoto et al.

(10) Patent No.: US 11,400,910 B2
(45) Date of Patent: Aug. 2, 2022

(54) VEHICLE

(71) Applicant: TOYOTA JIDOSHA KABUSHIKI KAISHA, Toyota (JP)

(72) Inventors: Tetsuya Fujimoto, Toyota (JP); Ikuru Konno, Toyoake (JP); Takenori Kubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/834,393

(22) Filed: Mar. 30, 2020

(65) Prior Publication Data

US 2020/0317179 A1 Oct. 8, 2020

(30) Foreign Application Priority Data

Apr. 3, 2019 (JP) .............................. JP2019-071276

(51) Int. Cl.
| | |
|---|---|
| *B60T 17/06* | (2006.01) |
| *B60T 17/04* | (2006.01) |
| *B60T 13/14* | (2006.01) |
| *B62D 33/06* | (2006.01) |

(52) U.S. Cl.
CPC ............ *B60T 17/06* (2013.01); *B60T 17/046* (2013.01); *B62D 33/06* (2013.01); *B60T 13/14* (2013.01)

(58) Field of Classification Search
CPC .......... B60T 11/22; B60T 11/26; B60T 17/06; B60T 17/046; B60T 17/04; B60T 17/222; B60T 13/14; B60T 13/662; B60T 13/745; B60T 13/142; B62D 33/06; B62D 33/0612

USPC ..................................... 188/151 R, 152, 345
See application file for complete search history.

(56) References Cited

U.S. PATENT DOCUMENTS

| | | | | |
|---|---|---|---|---|
| 2,844,940 | A | * 7/1958 | Huber ................... | B60T 11/224 60/588 |
| 3,076,314 | A | * 2/1963 | Stromberg .............. | B60T 11/16 60/567 |
| 3,313,110 | A | * 4/1967 | Von Rohr ................ | G05G 1/36 60/567 |
| 3,714,780 | A | * 2/1973 | Shellhause ................ | B60T 7/04 60/533 |

(Continued)

FOREIGN PATENT DOCUMENTS

| | | | |
|---|---|---|---|
| EP | 0399440 A2 | * 11/1990 | ............. B60T 11/26 |
| JP | 11-208529 A | 8/1999 | |

(Continued)

OTHER PUBLICATIONS

Coach Tours UK, "The LAVIS Project", retrieved from URL: www.coachtoursuk.com/lavis-project/, Apr. 2018, 3 pages.

*Primary Examiner* — Thomas J Williams
(74) *Attorney, Agent, or Firm* — Sughrue Mion, PLLC (57) ABSTRACT

A vehicle includes a vehicle cabin, a storage chamber, and a partition wall separating the storage chamber from the vehicle cabin. The storage chamber is arranged on at least one side of the vehicle cabin in the vehicle front-rear direction. The partition wall has an opening and the storage chamber communicates with the vehicle cabin via the opening. A cover configured to open and close the opening is provided over the opening. A brake fluid pressure generation device is stored in the storage chamber. The brake fluid pressure generation device includes a reservoir tank in which hydraulic fluid is accumulated and is arranged at a position facing the opening.

12 Claims, 8 Drawing Sheets

(56) References Cited

U.S. PATENT DOCUMENTS

| | | | | | |
|---|---|---|---|---|---|
| 4,662,237 | A | * | 5/1987 | Kami | B60T 7/06 |
| | | | | | 180/90 |
| 5,033,267 | A | * | 7/1991 | Keane | B60T 11/16 |
| | | | | | 60/594 |
| 5,205,373 | A | * | 4/1993 | Kadokura | B60K 17/00 |
| | | | | | 180/233 |
| 10,106,206 | B1 | * | 10/2018 | Baccouche | B62D 29/046 |
| 2017/0232849 | A1 | | 8/2017 | Yamamoto et al. | |
| 2017/0253220 | A1 | | 9/2017 | Ishihara et al. | |
| 2017/0344048 | A1 | * | 11/2017 | Hall | G05G 1/34 |
| 2018/0065611 | A1 | * | 3/2018 | Matsuura | B60L 7/26 |
| 2019/0146494 | A1 | * | 5/2019 | Li | B62D 63/02 |
| | | | | | 701/23 |

FOREIGN PATENT DOCUMENTS

| | | | | | |
|---|---|---|---|---|---|
| JP | 2000185644 | A | * | 7/2000 | B60T 11/26 |
| JP | 2002-355143 | A | | 12/2002 | |
| JP | 2003191757 | A | * | 7/2003 | |
| JP | 2007-99057 | A | | 4/2007 | |
| JP | 2012-192762 | A | | 10/2012 | |
| JP | 2015016825 | A | * | 1/2015 | |
| JP | 2016-124355 | A | | 7/2016 | |
| KR | 10-2017-0096588 | A | | 8/2017 | |
| KR | 10-2017-0132723 | A | | 12/2017 | |

* cited by examiner

VEHICLE

INCORPORATION BY REFERENCE

The disclosure of Japanese Patent Application No. 2019-071276 filed on Apr. 3, 2019 including the specification, drawings and abstract is incorporated herein by reference in its entirety.

BACKGROUND

1. Technical Field

The present disclosure relates to a vehicle including a vehicle cabin and a storage chamber formed dividedly from the vehicle cabin.

2. Description of Related Art

For example, Japanese Unexamined Patent Application Publication No. 2012-192762 (JP 2012-192762 A) describes that a vehicle body floor below a driver seat is swollen upward such that a space is formed between the driver seat and the vehicle body floor, and a brake fluid pressure generation device is arranged inside the space.

Further, JP 2012-192762 A describes that a seat cushion of the driver seat is attached to a vehicle body in a movable manner, and an opening through which a connection operation of connecting a brake pipe to the brake fluid pressure generation device is performable is formed in the vehicle body floor under the seat cushion such that the opening appears when the seat cushion is moved.

SUMMARY

JP 2012-192762 A does not describe that a reservoir tank is provided in the brake fluid pressure generation device. Accordingly, it is difficult to know a technical idea that maintenance of the reservoir tank is performable from the inside of a vehicle cabin.

In the meantime, in recent years, research and development of a vehicle (hereinafter also referred to as a self-driving vehicle) in which automated driving is enabled such that the vehicle is automatically controlled and driven have been carried out. However, it has not been sufficiently considered that, while the workability of maintenance of the brake fluid pressure generation device including the reservoir tank is improvable, a space for the vehicle cabin as a space to be used by an occupant is increased as large as possible.

The present disclosure provides a vehicle including a vehicle cabin and a storage chamber formed dividedly from the vehicle cabin, and the vehicle can improve the workability of maintenance of a brake fluid pressure generation device including a reservoir tank and increase a space for the vehicle cabin as a space to be used by an occupant as large as possible.

A first aspect of the disclosure relates to a vehicle. The vehicle includes a vehicle cabin, a storage chamber, and a partition wall. The storage chamber is arranged on at least one side of the vehicle cabin in the vehicle front-rear direction. The partition wall separates the storage chamber from the vehicle cabin. The partition wall has an opening and the storage chamber communicates with the vehicle cabin via the opening. A cover configured to open and close the opening is provided over the opening. A first brake fluid pressure generation device included in a braking device for wheel braking is stored in the storage chamber. The first brake fluid pressure generation device includes a reservoir tank in which hydraulic fluid is accumulated. The first brake fluid pressure generation device including the reservoir tank is arranged at a position facing the opening.

In the first aspect, even if the first brake fluid pressure generation device provided with the reservoir tank that requires regular maintenance is not arranged in the uppermost part in the storage chamber, or even if another member is provided between the opening and the first brake fluid pressure generation device, the first brake fluid pressure generation device is observable from the opening.

Consequently, at the time of performing maintenance on the first brake fluid pressure generation device, the maintenance is performable from the vehicle cabin side through the opening. Thus, the workability of the maintenance is improved in comparison with a case where the first brake fluid pressure generation device is stored at a position where the first brake fluid pressure generation device is not observable from the opening or a position far from the opening, for example.

Besides, in the first aspect, in comparison with a case where the first brake fluid pressure generation device is stored in the vehicle cabin, a space for the vehicle cabin can be increased as large as possible. This improves the degree of freedom of the layout in the vehicle cabin.

In the first aspect, the first brake fluid pressure generation device may include an actuator body portion configured to supply brake fluid pressure to a wheel brake unit, and an electric motor configured to pressurize the hydraulic fluid in the reservoir tank and supply the hydraulic fluid to the actuator body portion as the brake fluid pressure. The actuator body portion and the electric motor may be arranged at the position facing the opening.

In the above configuration, the actuator body portion and the electric motor are also easily observable from the opening as well as the reservoir tank in the first brake fluid pressure generation device. This accordingly makes it possible to improve the workability of maintenance of the actuator body portion and the electric motor.

In the first aspect, the first brake fluid pressure generation device may include a master cylinder configured to generate brake fluid pressure to be supplied to a wheel brake unit by causing a piston to stroke in a cylinder housing to which the hydraulic fluid in the reservoir tank is supplied, and a drive unit configured to cause the piston to stroke. The master cylinder and the reservoir tank may be arranged such that the master cylinder and the reservoir tank overlap each other in a vehicle side view.

In the above configuration, in comparison with a case where the master cylinder and the reservoir tank are arranged in the vehicle front-rear direction, it is possible to shorten the storage chamber in the vehicle front-rear direction. This accordingly makes it possible to increase a space for the vehicle cabin in the vehicle front-rear direction as large as possible.

In the first aspect, a longitudinal direction of the master cylinder may be along a direction different from the vehicle front-rear direction.

In the above configuration, in comparison with a case where, for example, the master cylinder is arranged such that the longitudinal direction of the master cylinder is along the vehicle front-rear direction like a general manual driving vehicle, it is possible to reduce the storage chamber in size in the vehicle front-rear direction. This is advantageous to increase the space for the vehicle cabin as large as possible.

In the first aspect, in the storage chamber, a second brake fluid pressure generation device may be stored at the position facing the opening.

In the above configuration, when the first brake fluid pressure generation device is inoperable, for example, the wheel brake unit can be actuated by the second brake fluid pressure generation device. This is advantageous to achieve fail safe. Besides, the second brake fluid pressure generation device is also observable from the opening. Consequently, at the time of performing maintenance on the second brake fluid pressure generation device, the maintenance is performable from the vehicle cabin side through the opening.

In the first aspect, the second brake fluid pressure generation device may include: a master cylinder configured to generate brake fluid pressure to be supplied to a wheel brake unit by causing a piston to stroke in a cylinder housing to which the hydraulic fluid in the reservoir tank is supplied; a pushing member configured to cause the piston of the master cylinder to stroke; and a drive unit configured to drive the pushing member. The pushing member and the master cylinder may be arranged in the vehicle width direction.

In the above configuration, in comparison with a case where, for example, the master cylinder is arranged such that the longitudinal direction of the master cylinder is along the vehicle front-rear direction like a general manual driving vehicle, it is possible to reduce the storage chamber in size in the vehicle front-rear direction. This is advantageous to increase the space for the vehicle cabin as large as possible.

In the first aspect, the pushing member may be arranged at the nearest position to the opening in the storage chamber.

With the above configuration, it is possible to improve the workability of maintenance of the pushing member.

In the first aspect, an air-conditioning device may be further stored in the storage chamber, and the first brake fluid pressure generation device may be arranged at a position closer to the opening than the air-conditioning device.

In the above configuration, the first brake fluid pressure generation device and the air-conditioning device are stored in the storage chamber in consideration that the air-conditioning device requires maintenance less frequently than the first brake fluid pressure generation device. Thus, while the workability of maintenance of the first brake fluid pressure generation device can be improved, the space for the vehicle cabin can be increased as large as possible in comparison with a case where the air-conditioning device is provided in the vehicle cabin.

In the first aspect, the cover may be constituted by a part of trim components of the vehicle cabin.

In the above configuration, an exclusive cover (an additional component) is unnecessary. This is advantageous for a reduction in cost and is also advantageous to increase the degree of freedom of the layout in the vehicle cabin such that the inside of the vehicle cabin can be utilized effectively.

In the first aspect, a trim component constituting the cover may be an occupant seat, and the occupant seat may be arranged so as to face a direction different from a direction where the vehicle travels forward.

In the first aspect, the direction different from the direction where the vehicle travels forward may be rearward of the vehicle in the vehicle front-rear direction.

In the above configuration, an exclusive cover (an additional component) is unnecessary. This is advantageous for a reduction in cost and is also advantageous to increase the degree of freedom of the layout in the vehicle cabin such that the inside of the vehicle cabin can be utilized effectively.

A second aspect of the present disclosure relates to a vehicle for autonomous driving in which no driver seat is provided. The vehicle includes a vehicle cabin, a storage chamber, and a partition wall. In the vehicle cabin, at least an occupant and baggage are stored. In the storage chamber, a vehicle component part is stored, and the storage chamber is arranged on at least one side of the vehicle cabin in the vehicle front-rear direction in a state where the storage chamber is separated from the vehicle cabin.

The partition wall separates the storage chamber from the vehicle cabin. The partition wall has an opening and the storage chamber communicates with the vehicle cabin via the opening. An occupant seat is provided over the opening such that the occupant seat covers the opening, the occupant seat being arranged so as to face a direction different from a direction where the vehicle travels forward.

In the second aspect, the direction different from the direction where the vehicle travels forward may be rearward of the vehicle in the vehicle front-rear direction.

Note that the automated driving includes fully-automated driving that does not need any operation by an occupant at all and also includes semi-automated driving in which the occupant performs auxiliary operations. With the second aspect, it is possible to respond to a request to increase the space for the vehicle cabin as large as possible.

Further, the vehicle component parts include a brake fluid pressure generation device including a reservoir tank, an air-conditioning device, an electric drive motor, a heat exchanger for a cooling system, and so on. The brake fluid pressure generation device including the reservoir tank can be arranged at the position facing the opening, and among the vehicle component parts, a vehicle component part that requires less frequent maintenance than the brake fluid pressure generation device can be arranged below the brake fluid pressure generation device. Alternatively, among the vehicle component parts, a vehicle component part that requires frequent maintenance can be arranged at the position facing the opening, and a vehicle component part that requires less frequent maintenance can be arranged at a position far from the opening.

With the first aspect and the second aspect of the present disclosure, it is possible to provide a vehicle that can improve the workability of maintenance of a brake fluid pressure generation device including a reservoir tank and increase a space for a vehicle cabin as a space to be used by an occupant as large as possible.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment for carrying out the present disclosure in detail with reference to the attached drawings.

Figure 1:
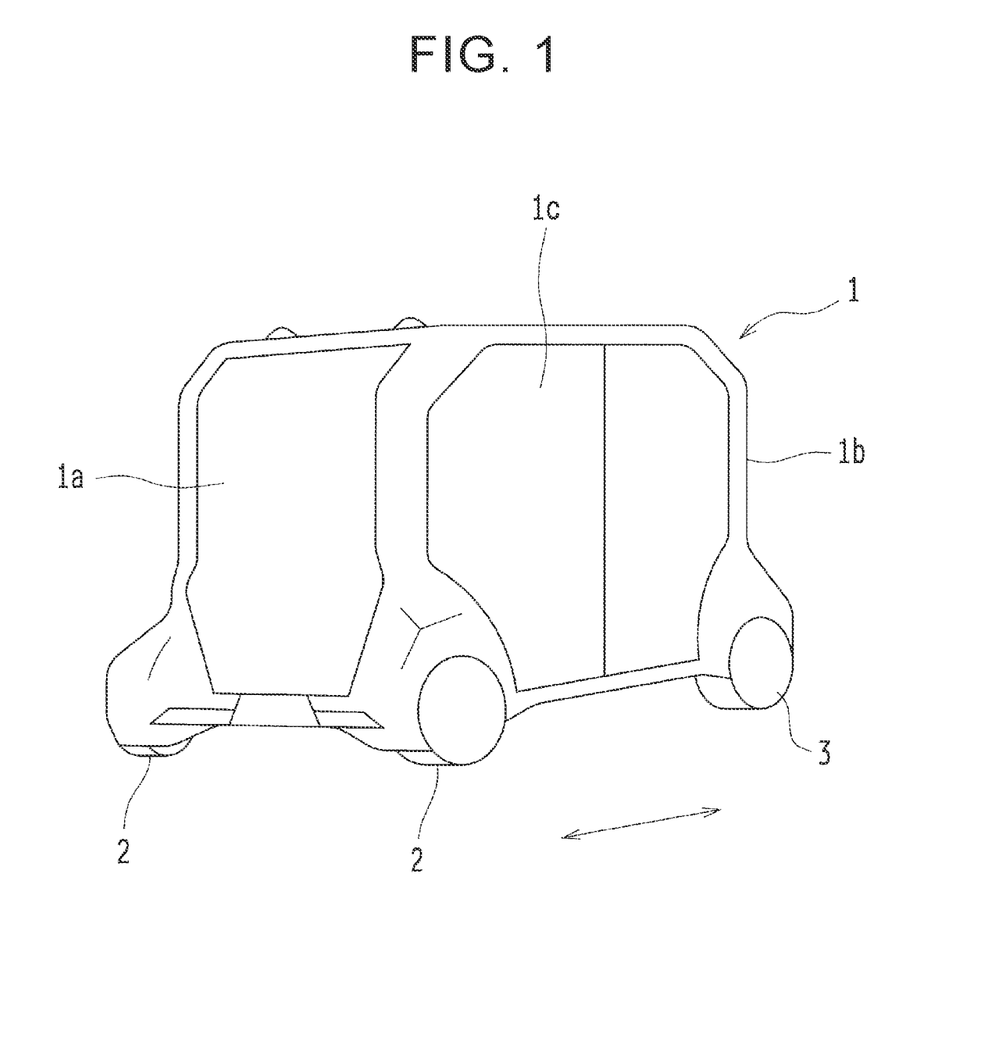
FIG. 1 is a perspective view schematically illustrating an external appearance of a vehicle according to an embodiment of the present disclosure.

One embodiment of the present disclosure is illustrated in FIGS. 1 to 8. As illustrated in FIG. 1, a vehicle 1 described in the present embodiment has an external appearance that is greatly different from a manual driving vehicle including a conventional and general driver seat in that the vehicle 1 has a vehicle body that is almost symmetrical in an advancing direction (see an arrow in FIG. 1), wheels 2, 3 are arranged extremely close to both ends of the vehicle 1, respectively, there is no hood or the like covering an engine compartment (a motor room), and an almost entire surface of a vehicle side face 1c is configured as a doorway.

Note that, since the vehicle 1 can advance to both sides in the advancing direction in generally the same mode, there is no concept of a front side and a rear side in the vehicle 1. However, for convenience, the left side in FIG. 1 is described as a front end portion 1a (reference numerals 2 indicate front wheels), and the right side in FIG. 1 is described as a rear end portion 1b (reference numerals 3 indicate rear wheels). Further, in each of the drawings, an arrow Fr indicates the front side in the vehicle front-rear direction, an arrow Rh indicates the right side in the vehicle width direction, and an arrow Up indicates the upper side. Further, the manual driving vehicle indicates a vehicle including a driver seat that allows a user to operate steering, an accelerator pedal, and a brake pedal in a state where the user sits on the driver seat.

Figure 2:
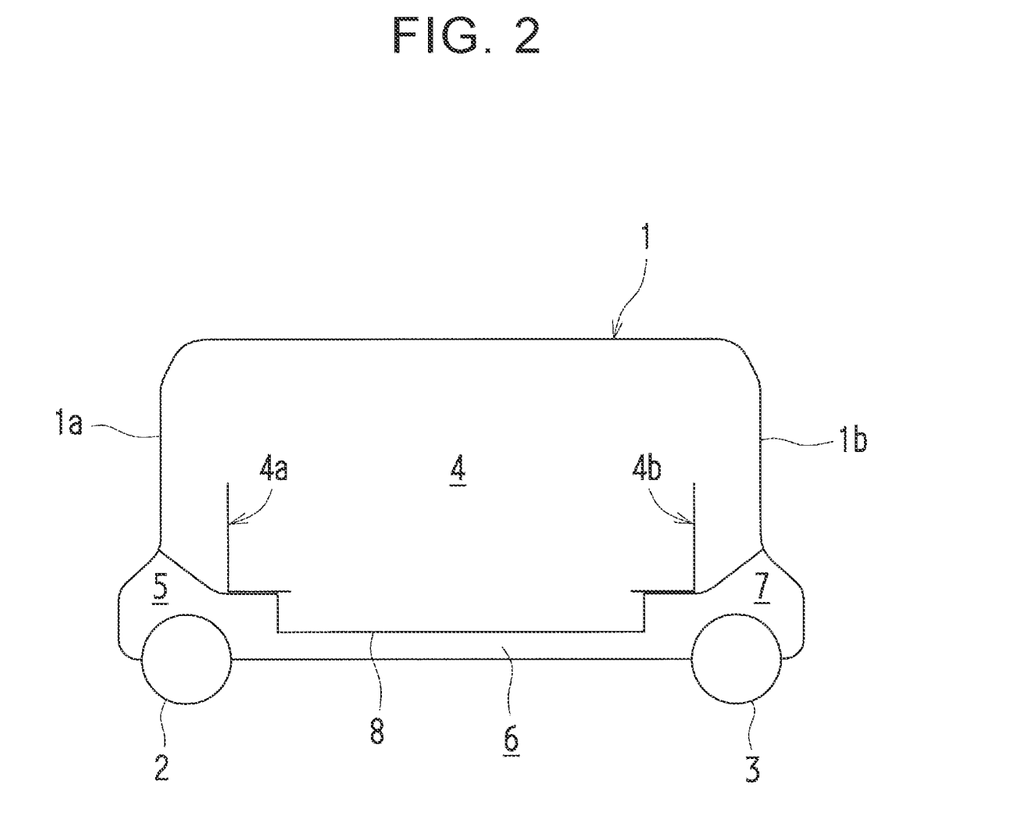
FIG. 2 is a vertical sectional view schematically illustrating the inside of the vehicle of FIG. 1.

Note that the vehicle 1 is a vehicle in which so-called "automated driving" is enabled, and because of this, not only the external appearance but also the inside of the vehicle 1 is greatly different from that of the manual driving vehicle including a conventional and general driver seat, as illustrated in FIG. 2. Note that the "automated driving" is a concept that includes not only fully-automated driving that does not need any operation by an occupant at all, but also semi-automated driving in which the occupant performs auxiliary operations.

For example, the vehicle 1 performs automated driving such that an ECU 50 (see FIG. 4) as a control device actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on.

Therefore, in the vehicle 1, the presence of a so-called "driver" is not essential, and no driver seat is provided in a vehicle cabin 4 as illustrated in FIG. 2. For example, in the vehicle cabin 4, occupant seats 4a, 4b are provided on the front side and the rear side in the vehicle front-rear direction such that the occupant seats 4a, 4b face each other in the vehicle front-rear direction. The occupant seats 4a, 4b are each configured such that a plurality of occupants can be seated side by side. Further, an operation part to be operated by a driver, e.g., a steering wheel or a brake pedal mechanically connected to the wheels 2 or the wheels 3, are not permanently provided in the vehicle cabin 4. Because of this, a proportion of the vehicle cabin 4 in the entire vehicle 1 is very large. Note that the state where "the operation part is not permanently provided in the vehicle cabin 4" includes a case where the operation part is not provided at all in the vehicle 1 itself and also includes a case where the operation part that is normally hidden in a first storage chamber 5, a second storage chamber 7, or a third storage chamber 6 appears in the vehicle cabin 4 as a result of a button operation and so on, for example, when an unexpected situation occurs.

As a matter of course, the vehicle 1 is configured to perform the fully-automated driving by the ECU 50 and so on and also perform the semi-automated driving in which an auxiliary operation is performed by an operator as a monitoring person who is in the vehicle cabin 4.

For example, a system of the vehicle 1 is configured such that the operator monitors situations around the vehicle 1 when a periphery image captured by the camera is projected on a tablet PC (not shown) owned by the operator, and the operator actuates an emergency stop brake or the like by pressing a button icon on an image on the tablet PC.

Note that the presence of the operator in the vehicle cabin 4 is also not essential, and for example, an operator and so on in an external management center may play a role of the operator inside the vehicle cabin 4, or an external server may play a similar role.

Further, in the vehicle 1, the first storage chamber 5 and the second storage chamber 7 are formed in the front end portion 1a and the rear end portion 1b of the vehicle 1, respectively, such that the first storage chamber 5 and the second storage chamber 7 partially overlap the vehicle cabin 4 in the vehicle front-rear direction, as illustrated in FIG. 2. In the first storage chamber 5 and the second storage chamber 7, driving system apparatuses and electric system apparatuses such as the ECU 50, the electric drive motor 51, the steering actuator, and the brake actuator 20 are stored.

More specifically, the first storage chamber 5 placed on the front side in the vehicle front-rear direction and the second storage chamber 7 placed on the rear side in the vehicle front-rear direction are separated from the vehicle cabin 4 by frame members such as front side members 65 (see FIG. 6) and a cross-member 63 (see FIG. 6) to be described later, and panel members of a cabin constituting the vehicle cabin 4 (hereinafter also referred to as a frame member 8 or the like). Thus, in the vehicle 1, spaces above the first storage chamber 5 and the second storage chamber 7 can be used as the vehicle cabin 4.

Note that the electric vehicle 1 in the present embodiment employs a drive system in which the electric drive motor 51 inputs driving force into the rear wheels 3. The electric drive motor 51 uses a battery 52 as a power source. The battery 52 is arranged in the third storage chamber 6 provided under the floor of the vehicle cabin 4 of the electric vehicle 1.

As such, by elaborating configurations, structures, and arrangement of various pieces of onboard equipment, the vehicle 1 of the present embodiment that is greatly different from a manual driving vehicle including a conventional and general driver seat is achieved as a vehicle in which the proportion of the vehicle cabin 4 in the entire vehicle 1 is very large (proportions of the first storage chamber 5, the second storage chamber 7, and so on where the onboard equipment is stored are very low), as described above.

The following describes details of a functional configuration, a structure, arrangement, and so on of a braking device 10 as a part of factors that achieve such a relatively wide vehicle cabin 4.

Schematic Configuration of Braking Device 10

Figure 3:
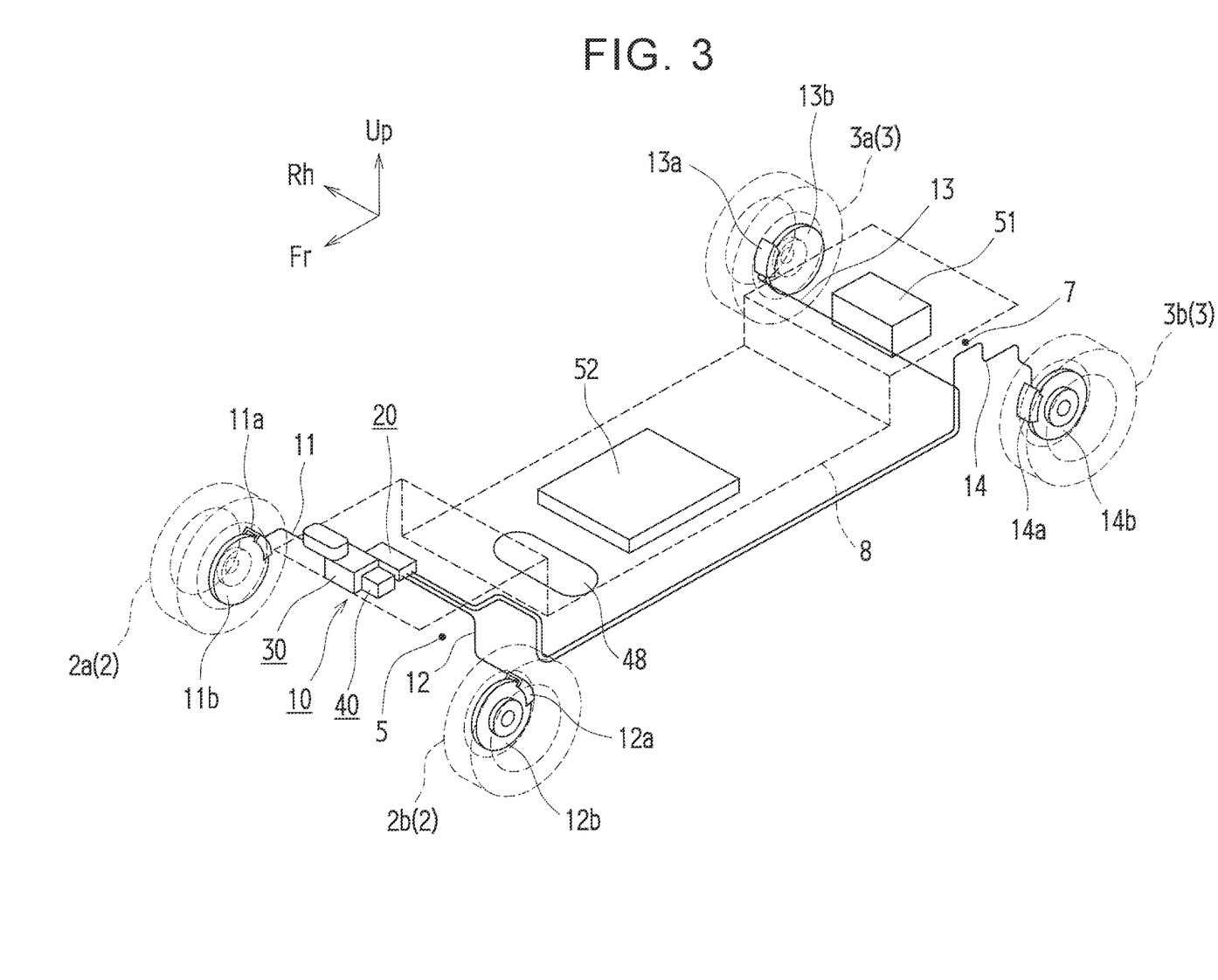
FIG. 3 is a perspective view schematically illustrating a braking device.

The braking device 10 is used to brake the wheels 2, 3. As illustrated in FIG. 3, the braking device 10 includes the brake actuator 20 as a primary brake fluid pressure generation device, a brake unit 30 as a secondary brake fluid pressure generation device, a brake pedal unit 40 as an emergency brake fluid pressure generation device, a wheel brake unit (its reference numeral is omitted) to be described below, and so on.

Details of configurations of the brake actuator 20, the brake unit 30, and the brake pedal unit 40 will be described later, but the brake actuator 20 and the brake unit 30 are electrically actuated devices configured to generate brake fluid pressure in electric motors 26, 36 (see FIG. 5), respectively, by use of, as a power source, the battery 52 arranged in the third storage chamber 6 in the central part of the vehicle 1. The brake pedal unit 40 is a pneumatically actuated device configured to be actuated by compressed air filled in an air tank 48 arranged in the third storage chamber 6.

Further, the wheel brake unit is configured to brake (decelerate or stop) the wheels 2, 3 by the brake fluid pressure generated by the brake actuator 20, the brake unit 30, and the brake pedal unit 40. The wheel brake unit includes first to fourth brake pipes 11, 12, 13, 14, first to fourth brake calipers 11a, 12a, 13a, 14a, first to fourth brake discs 11b, 12b, 13b, 14b, and so on.

Figure 4:
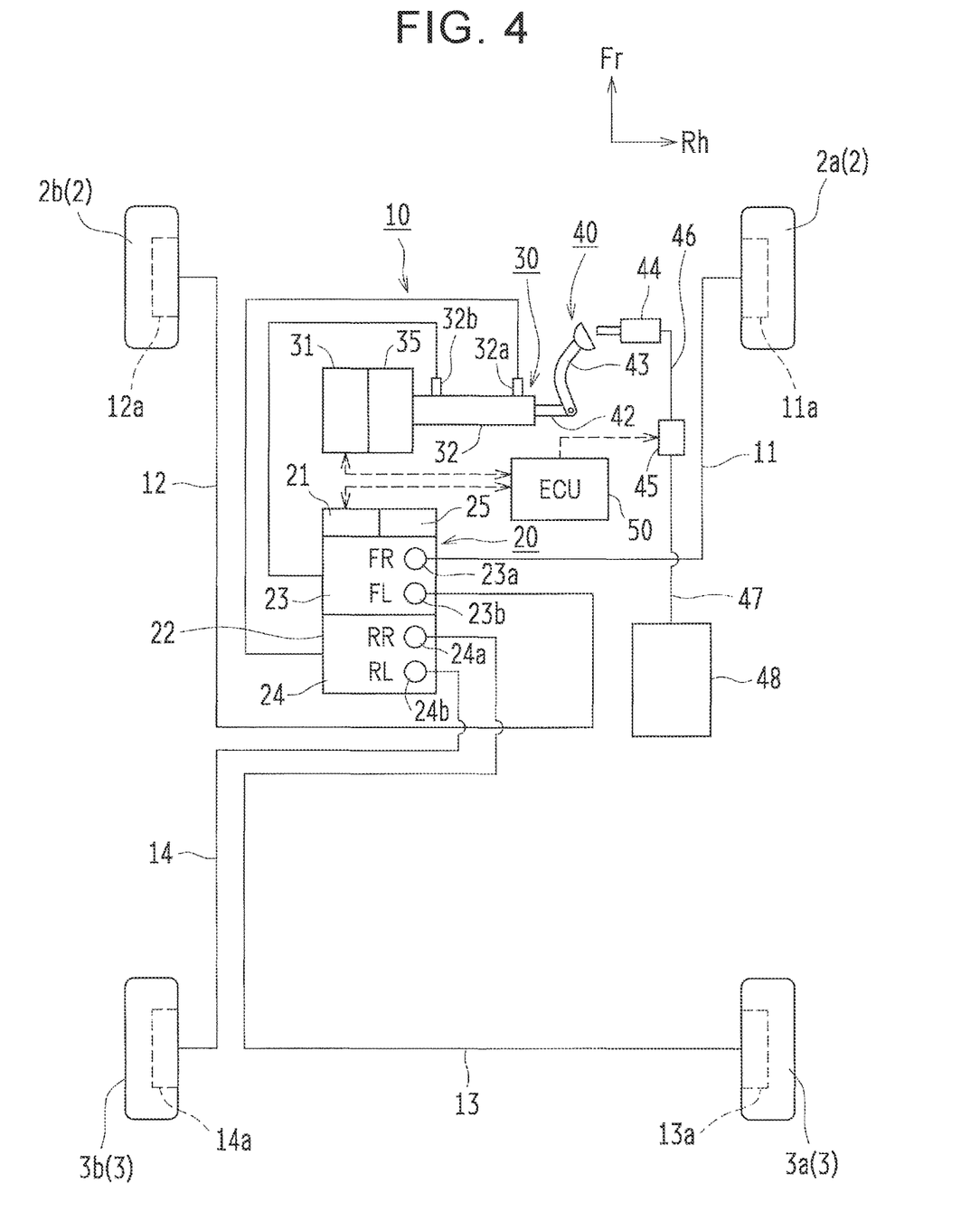
FIG. 4 is a view illustrating a schematic configuration of the braking device.

The first brake caliper 11a and the first brake disc 11b are provided in a part supporting a right front wheel (indicated by a reference numeral 2a in FIGS. 3 and 4). The first brake caliper 11a is connected to a first port 23a (see FIG. 4) of the brake actuator 20 via the first brake pipe 11 extending to the right side in the vehicle width direction inside the first storage chamber 5.

The second brake caliper 12a and the second brake disc 12b are provided in a part supporting a left front wheel (indicated by a reference numeral 2b in FIGS. 3 and 4). The second brake caliper 12a is connected to a second port 23b (see FIG. 4) of the brake actuator 20 via the second brake pipe 12 extending to the left side in the vehicle width direction inside the first storage chamber 5.

The third brake caliper 13a and the third brake disc 13b are provided in a part supporting a right rear wheel (indicated by a reference numeral 3a in FIGS. 3 and 4). The third brake caliper 13a is connected to a third port 24a (see FIG. 4) of the brake actuator 20 via the third brake pipe 13. The third brake pipe 13 first extends to the left side in the vehicle width direction inside the first storage chamber 5 and then extends rearward in the vehicle front-rear direction inside the third storage chamber 6 so as to reach the second storage chamber 7. Then, the third brake pipe 13 extends to the right side in the vehicle width direction inside the second storage chamber 7.

The fourth brake caliper 14a and the fourth brake disc 14b are provided in a part supporting a left rear wheel (indicated by a reference numeral 3b in FIGS. 3 and 4). The fourth brake caliper 14a is connected to a fourth port 24b (see FIG. 4) of the brake actuator 20 via the fourth brake pipe 14. The fourth brake pipe 14 reaches the second storage chamber 7 similarly to the third brake pipe 13, and then, the fourth brake pipe 14 extends to the left side in the vehicle width direction inside the second storage chamber 7.

Detailed Configuration of Each Constituent of Braking Device 10

As illustrated in FIG. 4, as a brake fluid pressure transmission route in the braking device 10, the brake unit 30 and the brake pedal unit 40 are placed on the most upstream side, and the brake actuator 20 is placed on the downstream side from the brake unit 30 and the brake pedal unit 40, so that brake fluid pressure is supplied from the brake actuator 20 to the first to fourth brake calipers 11a, 12a, 13a, 14a.

The brake actuator 20 includes a brake ECU 21, an actuator body portion 22, a reservoir tank 25, the electric motor 26, and so on.

The brake ECU 21 is connected to the ECU 50 via a communication line and is configured to actuate the electric motor 26 based on a braking force request calculated by the ECU 50 based on information (a vehicle speed, a distance between a stop line and an obstacle, and so on) from the sensor, the camera, and so on so that the electric motor 26 pumps up hydraulic fluid from the reservoir tank 25 and pressurizes the hydraulic fluid. That is, the brake actuator 20 is configured to generate brake fluid pressure as much as necessary (to an extent requested by the ECU 50) when necessary (when the ECU 50 makes a request).

The actuator body portion 22 is divided into a first fluid chamber 23 and a second fluid chamber 24, as illustrated in FIG. 4.

The first and second ports 23a, 23b are formed in the first fluid chamber 23, and the hydraulic fluid pressurized by the electric motor 26 based on a command from the brake ECU 21 is supplied from the first and second ports 23a, 23b to the first and second brake calipers 11a, 12a, respectively.

The third and fourth ports 24a, 24b are formed in the second fluid chamber 24, and the hydraulic fluid pressurized by the electric motor 26 based on the command from the brake ECU 21 is supplied to the third and fourth brake calipers 13a, 14a via the third and fourth ports 24a, 24b, respectively.

Since the actuator body portion 22 is divided into two fluid chambers, i.e., the first fluid chamber 23 and the second fluid chamber 24, even if one of the fluid chambers is broken or the like, it is possible to supply the brake fluid pressure to the wheels 2, 3 from the other one of the fluid chambers without losing the brake fluid pressure.

Further, since the brake actuator 20 is placed on the downstream side from the brake unit 30, even when the brake unit 30 has a malfunction, it is possible to independently supply the brake fluid pressure to the first to fourth brake calipers 11a, 12a, 13a, 14a.

The brake unit 30 is configured such that, even in a case where the brake actuator 20 operates normally, when relatively large braking force is required, the brake unit 30 generates brake fluid pressure so as to assist the brake actuator 20. In the meantime, the brake unit 30 is configured to generate brake fluid pressure instead of the brake actuator 20 when the brake actuator 20 has a malfunction.

The brake unit 30 includes a brake ECU 31, a master cylinder 32, a reservoir tank 35, the electric motor 36, an accumulator 37, a first electromagnetic valve 38, a second electromagnetic valve 39, and so on.

Figure 5:
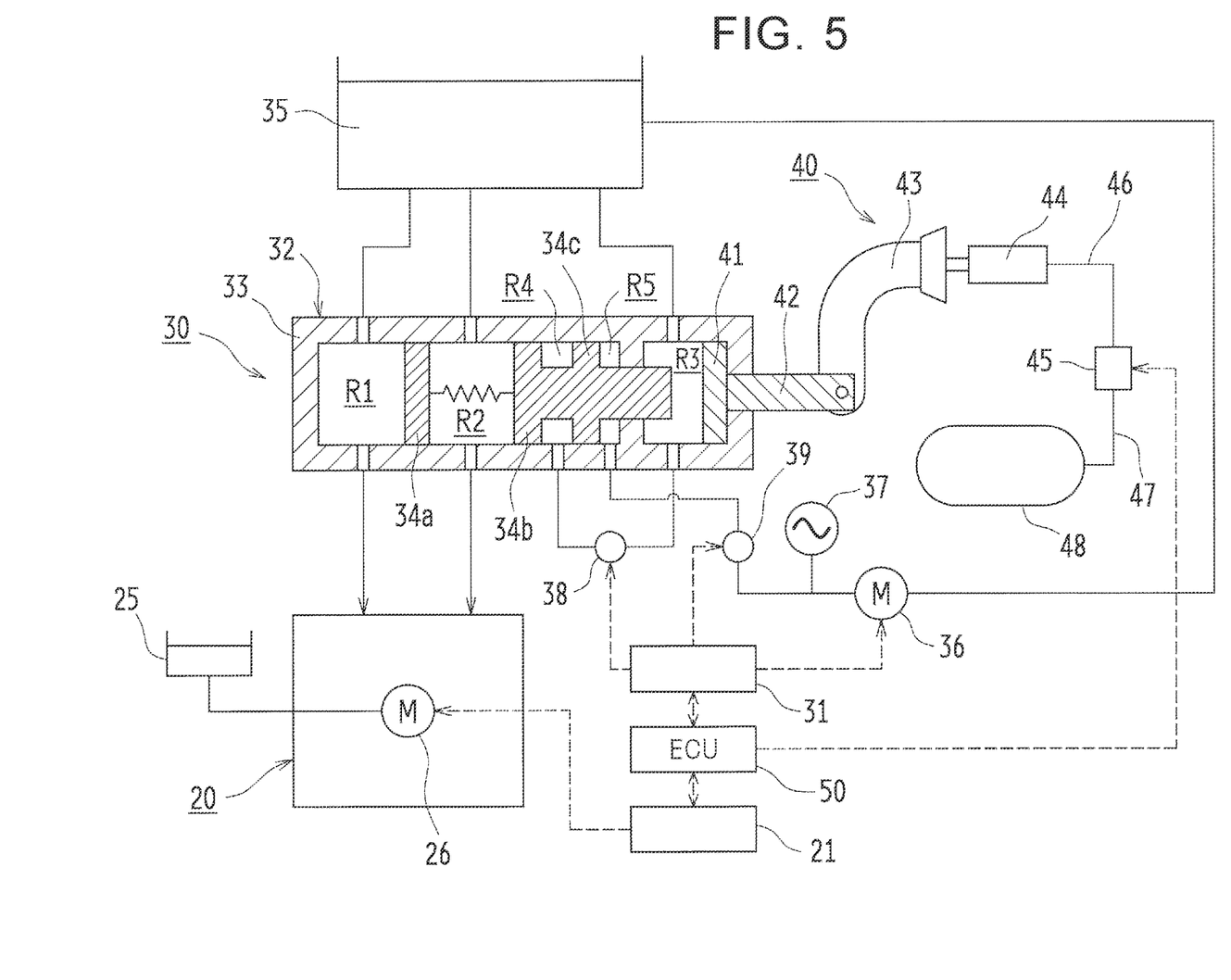
FIG. 5 is a view schematically illustrating brake fluid pressure generation devices in FIG. 4 (a brake actuator, a brake unit, and a brake pedal unit)

As illustrated in FIG. 5, the master cylinder 32 is configured to generate brake fluid pressure in accordance with strokes of first and second pistons 34a, 34b sliding inside a cylinder housing 33.

First to fifth fluid chambers R1, R2, R3, R4, R5 are formed dividedly from each other by the cylinder housing 33 of the master cylinder 32, the first and second pistons 34a, 34b, and an input piston 41.

The first fluid chamber R1 is connected to the reservoir tank 35 and the first fluid chamber 23 of the brake actuator 20, and hydraulic fluid inside the first fluid chamber R1 is pressurized by the first piston 34a.

The second fluid chamber R2 is formed between the first piston 34a and the second piston 34b and is connected to the reservoir tank 35 and the second fluid chamber 24 of the brake actuator 20. Hydraulic fluid inside the second fluid chamber R2 is pressurized by the second piston 34b.

A rib portion 34c is provided in the second piston 34b such that the fourth fluid chamber R4 is formed dividedly on a first side of the rib portion 34c (a side close to the first and second fluid chambers R1, R2), and the fifth fluid chamber R5 is formed dividedly on a second side of the rib portion 34c (a side close to the third fluid chamber R3).

The third fluid chamber R3 is connected to the reservoir tank 35 and the fourth fluid chamber R4, and hydraulic fluid inside the third fluid chamber R3 is pressurized by the input piston 41. Note that the third fluid chamber R3 and the fourth fluid chamber R4 are connected to each other via the first electromagnetic valve 38 that opens in an energized state.

The electric motor 36 is configured to pressurize hydraulic fluid pumped up from the reservoir tank 35 and accumulate the hydraulic fluid thus pressurized in the accumulator 37. The accumulator 37 is connected to the fifth fluid chamber R5 via the second electromagnetic valve 39 that opens in the energized state.

The brake ECU 31 is connected to the ECU 50 via a communication line, and based on a braking force request calculated by the ECU 50, the brake ECU 31 opens the second electromagnetic valve 39 so as to release the high-pressure hydraulic fluid so that the first and second pistons 34a, 34b are slid inside the cylinder housing 33 by the high-pressure hydraulic fluid.

Note that the brake ECU 31 is configured to maintain the first electromagnetic valve 38 in the energized state (a valve open state) except when the brake ECU 31 actuates the brake pedal unit 40 and also maintain the second electromagnetic valve 39 in a non-energized state (a valve close state) except when the brake ECU 31 actuates the brake unit 30.

The brake fluid pressure thus generated in accordance with the strokes of the first and second pistons 34a, 34b is supplied from the first and second ports 32a, 32b of the master cylinder 32 to the first to fourth brake calipers 11a, 12a, 13a, 14a via the first and second fluid chambers 23, 24 of the brake actuator 20, as illustrated in FIG. 4.

As such, the brake unit 30 generates the brake fluid pressure independently from the brake actuator 20. Accordingly, even in a case where an electric system of the brake actuator 20 has a malfunction, when at least either one of the first and second fluid chambers 23, 24 is not damaged, it is possible to supply the brake fluid pressure to the wheels 2, 3.

The brake pedal unit 40 functions as an emergency brake fluid pressure generation device mainly at the time when the brake actuator 20 and the brake unit 30 are inoperative.

For example, the brake pedal unit 40 is configured to generate brake fluid pressure instead of the brake actuator 20 and the brake unit 30 when the vehicle 1 has power outage or the like.

As illustrated in FIGS. 4 and 5, the brake pedal unit 40 includes the input piston 41, a rod 42, a brake pedal 43, an air cylinder 44, a solenoid BOX 45, a hose 46, a hose 47, the air tank 48, and so on.

The input piston 41 is inserted into the cylinder housing 33 of the brake unit 30 in a slidable manner. The rod 42 connects the input piston 41 to the brake pedal 43.

The brake pedal 43 is biased by a spring (not shown) to an opposite direction from a direction where the input piston 41 is pushed toward a pressurizing side, and when a valve inside the solenoid BOX 45 closes, the brake pedal 43 returns to its original position.

The air cylinder 44 is connected to the air tank 48 via the solenoid BOX 45 configured such that the valve inside the solenoid BOX 45 closes in the energized state. The air cylinder 44 is configured to rotate the brake pedal 43 when the air cylinder 44 is actuated by the compressed air filled in the air tank 48 as the valve (not shown) inside the solenoid BOX 45 opens at the time when a given condition such as power outage of the vehicle 1 is satisfied. Note that the solenoid BOX 45 is energized so as to be maintained in a state where the valve (not shown) inside the solenoid BOX 45 is closed except when the ECU 50 actuates the brake pedal unit 40.

The air cylinder 44 communicates with the solenoid BOX 45 via the hose 46, and the solenoid BOX 45 communicates with the air tank 48 via the hose 47.

Note that a pneumatic pressure supply unit is constituted by the air cylinder 44, the solenoid BOX 45, the hoses 46, 47, and the air tank 48.

In such a brake pedal unit 40, the brake pedal 43 is rotated by the air cylinder 44 so as to push the input piston 41 (see FIG. 5) toward the pressurizing side. Hereby, the first and second pistons 34a, 34b of the master cylinder 32 are caused to stroke and generate brake fluid pressure.

The brake fluid pressure thus generated by the master cylinder 32 is supplied from the first and second ports 32a, 32b to the first to fourth brake calipers 11a, 12a, 13a, 14a via the first and second fluid chambers 23, 24 of the brake actuator 20.

Thus, the brake pedal unit 40 also generates the brake fluid pressure by use of the master cylinder 32. That is, in the present embodiment, both the brake unit 30 and the brake pedal unit 40 use the single master cylinder 32.

As such, the brake pedal unit 40 generates the brake fluid pressure independently from the brake actuator 20 and the brake unit 30. Accordingly, even in a case where the electric systems of the brake actuator 20 and the brake unit 30 have malfunctions, for example, when the given condition is satisfied, the brake pedal unit 40 can supply the brake fluid pressure to the wheels 2, 3.

Operation of Braking Device 10

As described above, in the present embodiment, (A) at normal time when the electric system does not have any malfunction or the like, the brake actuator 20 supplies the brake fluid pressure as the primary brake fluid pressure generation device.

In the meantime, (B) at abnormal time when the electric system and so on have a malfunction, (B-1) in a case where the brake actuator 20 has a malfunction, the brake unit 30 supplies the brake fluid pressure, and (B-2) in a case where the brake actuator 20 and the brake unit 30 have malfunctions due to power outage or the like, the brake pedal unit 40 supplies the brake fluid pressure.

Note that the brake fluid pressure of the emergency stop brake operated by the operator may be generated by any of the brake actuator 20, the brake unit 30, and the brake pedal unit 40.

Although not illustrated herein, the first to fourth brake calipers 11a, 12a, 13a, 14a each have a generally well-known configuration including a wheel cylinder and a brake pad. When the brake fluid pressure is supplied to the wheel cylinders from the first to fourth ports 23a, 23b, 24a, 24b, the brake pads are pressed against the first to fourth brake discs 11*b*, 12*b*, 13*b*, 14*b* so as to generate frictional braking force, so that the vehicle 1 is decelerated or stopped.

Next will be briefly described an example of a device configuration in which only the brake actuator 20 is actuated in the case of (A), the brake unit 30 is actuated in the case of (B-1), and the brake pedal unit 40 is actuated in the case of (B-2).

Here, in the case of (A), the brake ECU 31 closes the second electromagnetic valve 39 (the non-energized state), and the brake ECU 21 of the brake actuator 20 actuates the electric motor 26 so that the electric motor 26 pumps up the hydraulic fluid from the reservoir tank 25 and pressurizes the hydraulic fluid. Hereby, the vehicle 1 is decelerated or stopped by the brake fluid pressure from the brake actuator 20 only.

In the meantime, in the case of (B-1), the brake ECU 31 brings the second electromagnetic valve 39 into the energized state so that the second electromagnetic valve 39 opens, and the brake ECU 31 supplies hydraulic fluid stored in the accumulator 37 in a pressurized state to the fifth fluid chamber R5. Here, since the first electromagnetic valve 38 is in the energized state (in the valve open state), fluid pressure in the third fluid chamber R3 and fluid pressure in the fourth fluid chamber R4 that faces the third fluid chamber R3 cancel each other, so that the second piston 34*b* operates only with fluid pressure in the fifth fluid chamber R5. Thus, in the case of (B-1), the vehicle 1 is decelerated or stopped by the brake fluid pressure from the brake unit 30 only.

Further, in the case of (B-2), the first electromagnetic valve 38 closes and the valve inside the solenoid BOX 45 opens due to power outage, for example.

As a result, the air cylinder 44 is actuated by the compressed air filled in the air tank 48 so as to rotate the brake pedal 43, thereby resulting in that the input piston 41 is pushed toward the pressurizing side, and the fluid pressure in the third fluid chamber R3 increases.

Here, when the first electromagnetic valve 38 is closed, the fluid pressure in the third fluid chamber R3 does not cancel the fluid pressure in the fourth fluid chamber R4 that faces the third fluid chamber R3, so that the second piston 34*b* operates only with the fluid pressure in the third fluid chamber R3. Hereby, the vehicle 1 is decelerated or stopped by the brake fluid pressure from the brake pedal unit 40 only.

As described above, at normal time, the vehicle 1 of the present embodiment can be decelerated or stopped by the power of the battery 52, and when the vehicle 1 has power outage or the like, the vehicle 1 can be decelerated or stopped by the compressed air in the air tank 48 without a need of stepping force or the like applied by the driver. Accordingly, it is possible to employ the layout in which the brake pedal is not permanently provided in the vehicle cabin 4 as described above.

Arrangement of Brake Fluid Pressure Generation Device

As illustrated in FIG. 3, the brake actuator 20, the brake unit 30, the brake pedal unit 40, and an air conditioner unit 53 as an air-conditioning device are stored in the first storage chamber 5, and the electric drive motor 51 as a driving source of the vehicle 1 is stored inside the second storage chamber 7 provided on the opposite side from the first storage chamber 5. This makes it possible to appropriately set load distribution to the front side and the rear side of the vehicle.

Figure 8:
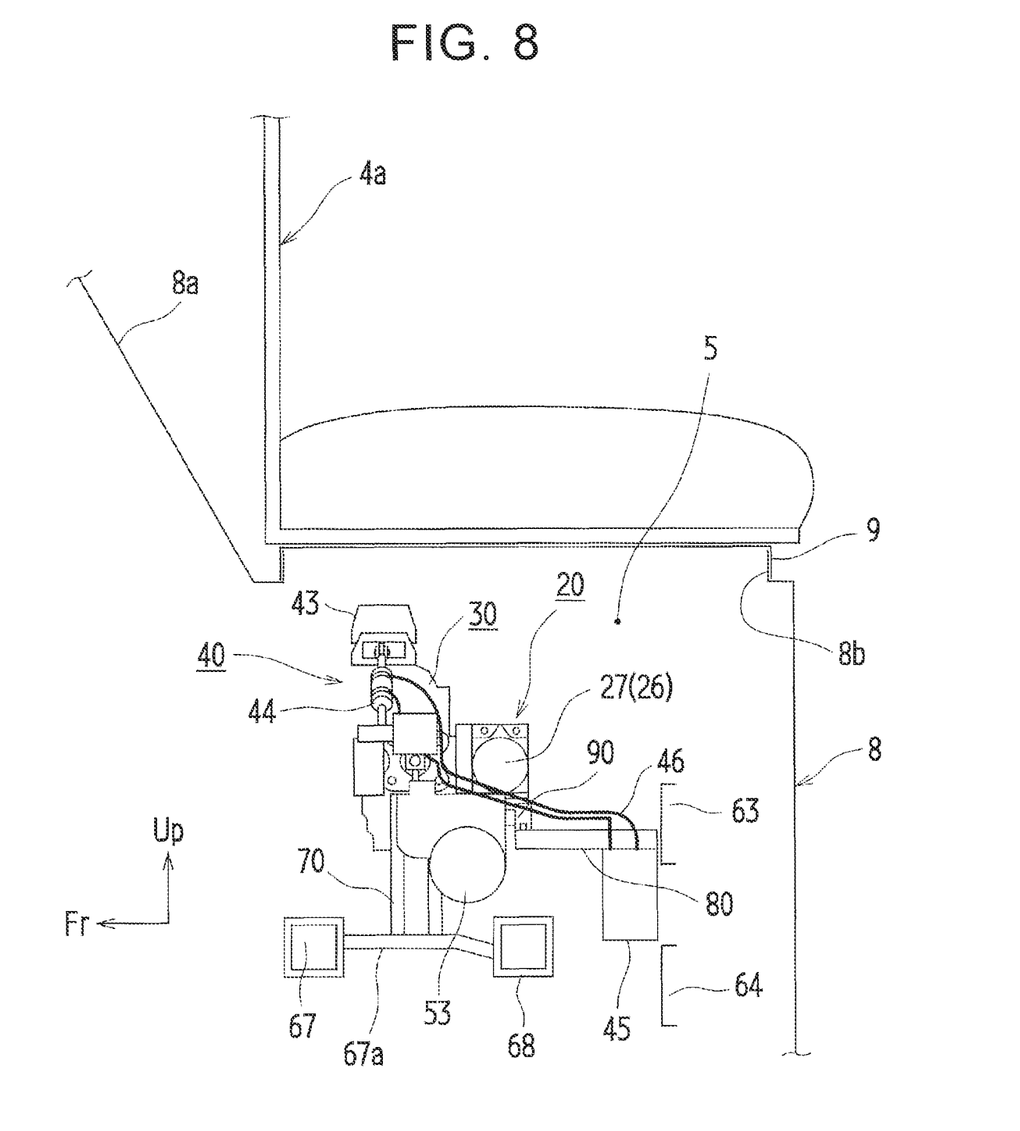
FIG. 8 is a view of the brake fluid pressure generation devices in FIG. 6 when the brake fluid pressure generation devices are viewed from their left side faces.

As illustrated in FIG. 8, the brake actuator 20, the brake unit 30, and the brake pedal unit 40 are stored at a position facing an opening 8*b* (a position close to the opening 8*b*). The opening 8*b* is formed in a partition wall 8*a* that separates the vehicle cabin 4 from the first storage chamber 5. Here, the "position facing the opening 8*b*" may be, for example, a position at which some of or all of the brake actuator 20, the brake unit 30, and the brake pedal 40 are observable from the opening 8*b* in a front view of the opening 8*b* viewed from the vehicle cabin side. A cover 9 configured to open and close the opening 8*b* is provided in the opening 8*b*. The cover 9 is an exclusive component, and the occupant seat 4*a* is arranged on the cover 9. Further, the brake pedal 43 of the brake pedal unit 40 is arranged at the nearest position to the opening 8*b*.

Note that the partition wall 8*a* is provided in the frame member 8. Although not illustrated herein, for example, the cover 9 can be constituted by a part of trim components (e.g., a shelf, a trim panel, the occupant seat 4*a*, and so on) of the vehicle cabin 4. In this case, the cover 9 is unnecessary, and therefore, this is advantageous for a reduction in cost.

Hereby, when the opening 8*b* is closed by the cover 9, the brake actuator 20, the brake unit 30, and the brake pedal unit 40 are not exposed to the vehicle cabin 4 side. In the meantime, when the cover 9 is removed to open the opening 8*b*, the brake actuator 20, the brake unit 30, and the brake pedal unit 40 are exposed to the vehicle cabin 4 side.

Consequently, at the time of performing maintenance on the brake actuator 20, the brake unit 30, and the brake pedal unit 40, the maintenance is performable from the vehicle cabin 4 side through the opening 8*b*. Thus, the workability of the maintenance is improved in comparison with a case where the brake actuator 20, the brake unit 30, and the brake pedal unit 40 are stored at a position where they are not observable from the opening 8*b* or a position far from the opening 8*b*, for example.

Next will be described the arrangement of the brake actuator 20, the brake unit 30, and the brake pedal unit 40 in the first storage chamber 5.

Figure 6:
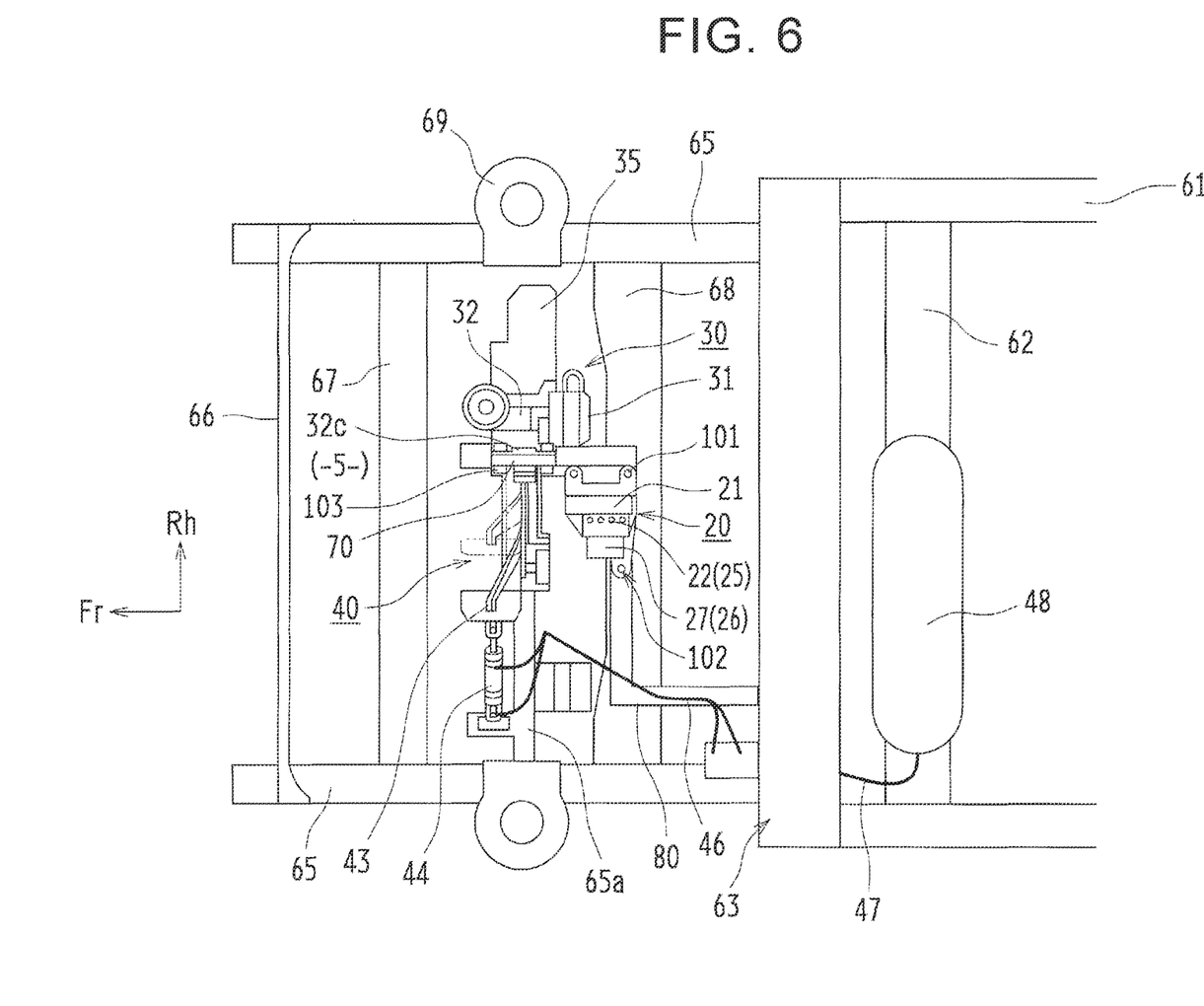
FIG. 6 is a plan view schematically illustrating a state where the brake fluid pressure generation devices in FIG. 5 are mounted on the vehicle.

First briefly described is the first storage chamber 5. As illustrated in FIG. 6, a pair of right and left side rails 61 is provided in a location corresponding to the third storage chamber 6 in FIG. 2 such that the right and left side rails 61 are placed on both end sides of the third storage chamber 6 in the vehicle width direction and extend in the vehicle front-rear direction.

The side rails 61 are connected to each other via a cross-member 62 extending in the vehicle width direction. Front end portions of the side rails 61 are connected to a lower cross-member 64 out of two cross-members 63, 64 arrayed in the up-down direction as illustrated in FIG. 8. The first storage chamber 5 is formed in front of the cross-members 63, 64 in the vehicle front-rear direction.

More specifically, as illustrated in FIG. 6, a pair of right and left front side members 65 is provided such that the right and left front side members 65 extend forward in the vehicle front-rear direction from both end portions, in the vehicle width direction, of the upper cross-member 63, and front end portions of the right and left front side members 65 are connected to each other via a cross-member 66.

Further, a pair of front and rear cross-members 67, 68 (see FIG. 8) is provided so as to stretch over between the right and left front side members 65 such that the front and rear cross-members 67, 68 extend in the vehicle width direction at a position below the front side members 65 and the cross-members 63, 66.

Figure 7:
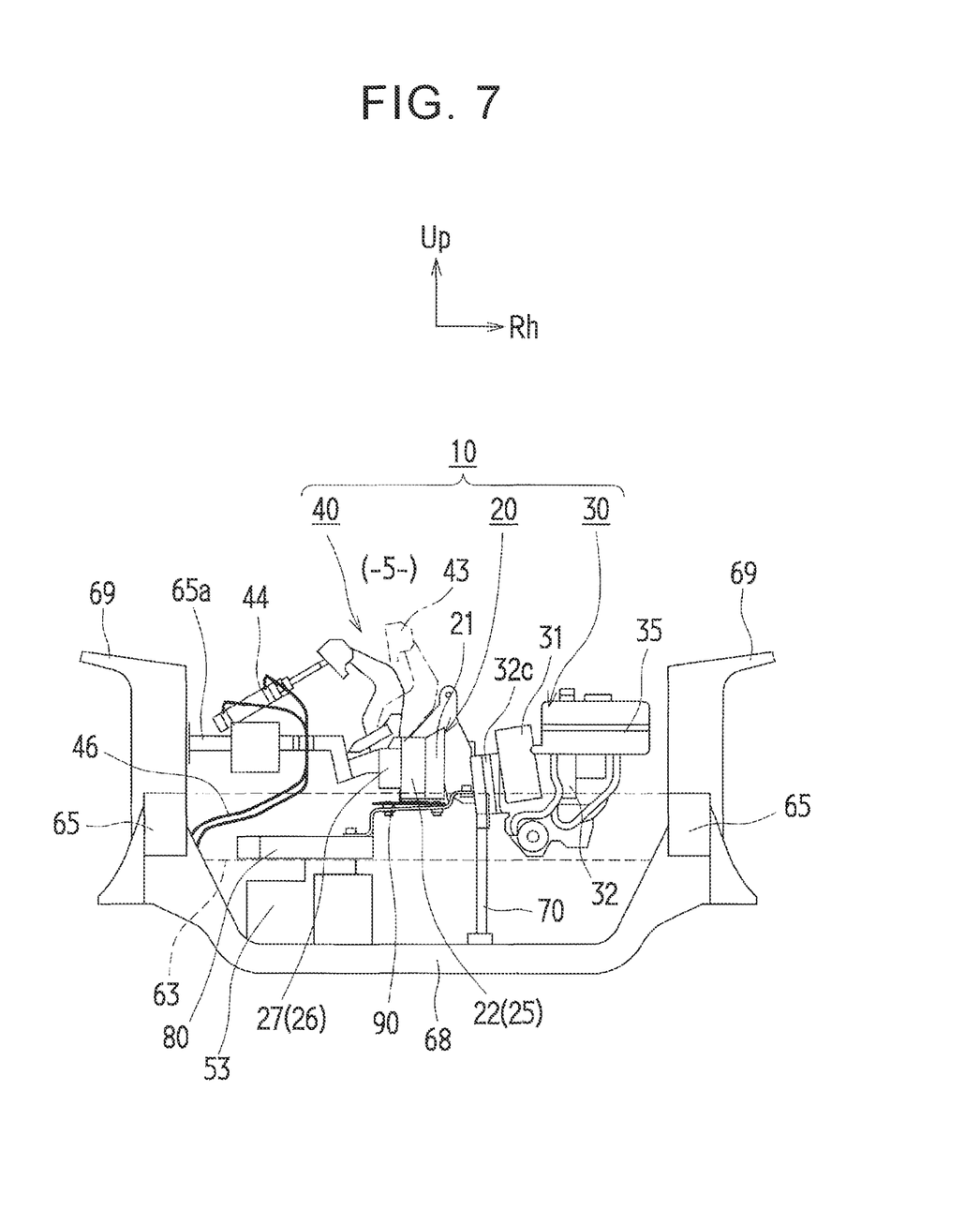
FIG. 7 is a view of the brake fluid pressure generation devices in FIG. 6 when the brake fluid pressure generation devices are viewed from a predetermined position behind them.

As illustrated in FIG. 7, each of the cross-members 67, 68 extends in the vehicle width direction such that both end portions thereof extend to be inclined upwardly toward outer sides in the vehicle width direction and are attached to respective lower parts of the front side members 65. Note that a reference numeral 69 in FIGS. 6 and 7 indicates a suspension tower.

With such a configuration, the right and left sides of the first storage chamber 5 are defined by the right and left front side members 65, the front and rear sides of the first storage chamber 5 are defined by the cross-members 63, 66, and the lower side of the first storage chamber 5 is defined by the cross-members 67, 68.

As illustrated in FIGS. 4, 6, and 7, in the brake unit 30, the reservoir tank 35 extending in the same direction as the cylinder housing 33 is provided above the cylinder housing 33 extending in a longitudinal direction of the master cylinder 32, that is, in a sliding direction of the first and second pistons 34a, 34b.

Therefore, as the brake unit 30 as a whole, a length of the brake unit 30 in an extending direction (a longitudinal direction) of the cylinder housing 33 is longer than a length of the brake unit 30 in a direction (a direction perpendicular to the longitudinal direction) orthogonal to the extending direction of the cylinder housing 33 and a length of the brake unit 30 in the up-down direction. Note that the brake ECU 31 is provided on a side face of the cylinder housing 33.

As such, as illustrated in FIGS. 6 and 7, the brake unit 30 with the longitudinal direction being along the extending direction of the cylinder housing 33 (the sliding direction of the first and second pistons 34a, 34b) is arranged in the first storage chamber 5 such that the longitudinal direction of the brake unit 30 is parallel to the vehicle width direction.

More specifically, as illustrated in FIG. 8, a support bracket 67a extending in the vehicle front-rear direction is provided so as to stretch over between the two cross-members 67, 68 arrayed in the front-rear direction.

As illustrated in FIG. 6, as a flange portion 32c of the cylinder housing 33 is fastened by bolts 103 to an upper end portion of a first bracket 70 extending upward from the support bracket 67a, the brake unit 30 is arranged such that its longitudinal direction is along the vehicle width direction.

Further, as illustrated in FIG. 6, the brake pedal unit 40 that shares the master cylinder 32 with the brake unit 30 is arranged in the first storage chamber 5 so as to be arrayed with the brake unit 30 in the vehicle width direction.

More specifically, the rod 42 extends in the vehicle width direction, the rod 42 being connected to the input piston 41 inserted in the cylinder housing 33 extending in the vehicle width direction. Therefore, the brake pedal 43 rotatably attached to a distal end portion of the rod 42 is also arrayed with the brake unit 30 in the vehicle width direction.

Further, the air cylinder 44 configured to rotate the brake pedal 43 is fixed to a bracket 65a extending in the vehicle width direction from the front side member 65 such that the air cylinder 44 is arrayed with the brake unit 30 and the brake pedal 43 in the vehicle width direction.

Note that the air tank 48 configured to supply the compressed air to the air cylinder 44 is arranged above the cross-member 62 provided behind the first storage chamber 5.

Hereby, in the present embodiment, as illustrated in FIG. 6, the brake unit 30 and the brake pedal unit 40 extending in the vehicle width direction are arrayed generally linearly in the vehicle width direction.

In the brake actuator 20, as illustrated in FIGS. 6 and 7, the brake ECU 21, the actuator body portion 22 (including the reservoir tank 25), and a motor housing 27 in which the electric motor 26 is housed are provided so as to be arrayed in this order. Therefore, as the brake actuator 20 as a whole, a length of the brake actuator 20 in an array direction (also referred to as an arrangement direction) where those members are arrayed is longer than a length of the brake actuator 20 in a direction orthogonal to the arrangement direction and a length of the brake actuator 20 in the up-down direction.

As such, as illustrated in FIGS. 6 and 7, the brake actuator 20 formed so as to be long in the arrangement direction is arranged behind the brake pedal 43 in the vehicle front-rear direction (near the brake unit 30 and behind the brake unit 30 in the vehicle front-rear direction) in the first storage chamber 5, such that the longitudinal direction (the arrangement direction) of the brake actuator 20 is parallel to the vehicle width direction.

More specifically, as illustrated in FIGS. 6 and 8, an L-shaped second bracket 80 is attached to the upper cross-member 63. The second bracket 80 is configured such that, after the second bracket 80 extends forward in the vehicle front-rear direction from a front end of the cross-member 63, the second bracket 80 is bent at a right angle and extends to the right side in the vehicle width direction.

A distal end portion of the second bracket 80 and the upper end portion of the first bracket 70 are connected to an actuator bracket 90 via respective bolts 101, 102, and hereby, the first and second brackets 70, 80 are integrated with the actuator bracket 90.

The brake actuator 20 is fastened to the actuator bracket 90 by bolts, and thus, the brake actuator 20 is arranged behind the brake pedal 43 in the vehicle front-rear direction such that the brake actuator 20 extends in the vehicle width direction.

Here, as illustrated in FIGS. 7 and 8, the brake actuator 20, the brake unit 30, and the brake pedal unit 40 are arranged at generally the same height in the first storage chamber 5. Further, generally, it is assumed that the brake pedal 43 is rotated by stepping force applied by a driver, and therefore, the brake pedal 43 is rotated below the rod 42. However, in the present embodiment, the brake pedal 43 is rotated by the air cylinder 44, so that the brake pedal 43 is rotated above the rod 42 as illustrated in FIGS. 7 and 8.

Hereby, as illustrated in FIG. 8, a relatively large space is formed below the brake actuator 20 and the brake pedal unit 40 in the first storage chamber 5. On this account, in the present embodiment, the air conditioner unit (the air-conditioning device) 53 is arranged in the space as illustrated in FIGS. 7 and 8.

As described above, in the embodiment to which the present disclosure is applied, the brake fluid pressure generation devices (the brake actuator 20 and the brake unit 30) as constituents that require regular maintenance are stored in the first storage chamber 5 separated from the vehicle cabin 4 such that the brake fluid pressure generation devices face the opening 8b.

Consequently, at the time of performing maintenance on the brake actuator 20 and the brake unit 30, the maintenance is performable while the brake actuator 20 and the brake unit 30 are observed from the vehicle cabin 4 side through the opening 8b. Thus, the workability of the maintenance is improved in comparison with a case where the brake actuator 20 and the brake unit 30 are stored at a position where the brake actuator 20 and the brake unit 30 are not observable from the opening 8b or at a position far from the opening 8b, for example.

Besides, in the above embodiment, the space for the vehicle cabin 4 as a space to be used by an occupant can be increased as large as possible in comparison with a case where the brake fluid pressure generation devices (the brake actuator 20 and the brake unit 30) are stored inside the vehicle cabin 4, thereby making it possible to improve the degree of freedom of the layout in the vehicle cabin 4.

Further, in the present embodiment, the brake unit 30 is arranged such that the longitudinal direction of the master cylinder 32, that is, the sliding direction of the first and second pistons 34a, 34b is parallel to the vehicle width direction.

This allows an axle (not shown), the cross-members 63, 67, 68, and so on provided along the vehicle width direction to be arranged in parallel to the brake unit 30 inside the first storage chamber 5.

On this account, in comparison with a case where the brake unit 30 is arranged, for example, in parallel to the vehicle front-rear direction like a manual driving vehicle including a conventional and general driver seat, in other words, a case where many devices and members extending in the vehicle width direction are provided together with the brake unit 30 arranged in parallel to the vehicle front-rear direction, the first storage chamber 5 can be reduced in size in the vehicle front-rear direction. This is accordingly advantageous to increase the space for the vehicle cabin 4 as large as possible.

Further, when the brake actuator 20 and the brake unit 30 are inoperable, the brake fluid pressure can be generated by the brake pedal unit 40 by causing the first and second pistons 34a, 34b of the master cylinder 32 to stroke. Therefore, it is possible to achieve fail safe. In addition, since the brake pedal unit 40 is arranged to be arrayed with the brake unit 30 in the vehicle width direction, it is possible to reduce the size of the first storage chamber 5.

Besides, the brake pedal unit 40 is stored in the first storage chamber 5 such that the brake pedal unit 40 faces the opening 8b. This makes it possible to improve the workability of maintenance of the brake pedal unit 40.

Further, the brake pedal unit 40 is pneumatically actuated. Accordingly, even when the vehicle 1 has power outage, the vehicle 1 can be surely decelerated or stopped without requesting operations by a driver. Thus, it is not necessary to provide a brake pedal and its equivalent in the vehicle cabin 4, thereby making it possible to further increase the space for the vehicle cabin 4.

Further, the brake actuator 20 is arranged behind (inwardly from) the brake unit 30 in the vehicle front-rear direction. Accordingly, even when the brake unit 30 thus arranged in front of (outwardly from) the brake actuator 20 in the vehicle front-rear direction is damaged at the time of a vehicle collision, it is possible to lower the possibility of breakage of the brake actuator 20.

Even when the brake unit 30 is damaged, it is possible to avoid malfunctions of the whole braking device 10 because the brake actuator 20 is provided on the downstream side from the brake unit 30 in the fluid pressure transmission route and generates the brake fluid pressure independently from the brake unit 30.

Further, since the brake actuator 20 is arranged near the brake unit 30 in the first storage chamber 5, it is possible to shorten the first to fourth brake pipes 11, 12, 13, 14 and to maintain the first storage chamber 5 to be compact.

Further, the brake actuator 20, the brake unit 30, and the brake pedal unit 40 are arranged at generally the same height in the first storage chamber 5, and the air conditioner unit (the air-conditioning device) 53 is arranged in a space formed below the braking device 10 inside the first storage chamber 5. In other words, in consideration that the air conditioner unit 53 requires maintenance less frequently than the brake fluid pressure generation devices (20, 30, 40), the air conditioner unit 53 is arranged below the brake fluid pressure generation devices (20, 30, 40) as illustrated in FIG. 8. Hereby, while the workability of maintenance of the brake fluid pressure generation devices (20, 30, 40) can be improved, the size of the first storage chamber 5 can be reduced in comparison with a case where the air conditioner unit 53 is provided in the vehicle cabin 4.

However, the present disclosure is not limited to this. Among the brake fluid pressure generation devices (the brake actuator 20 and the brake unit 30) including the reservoir tanks (25, 35), the air conditioner unit (the air-conditioning device) 53, the electric drive motor 51, a heat exchanger of a cooling system (not shown), and so on, a device that requires frequent maintenance can be arranged at a position facing the opening 8b, and a device that requires less frequent maintenance can be arranged at a position far from the opening 8b.

Due to the synergistic effect obtained by the compactification of the first storage chamber 5 and the forming of the first storage chamber 5 and the second storage chamber 7 such that the first storage chamber 5 and the second storage chamber 7 partially overlap the vehicle cabin 4 in the vehicle front-rear direction, it is possible to more surely increase the space for the vehicle cabin 4.

In addition, the brake pedal unit 40 employs a configuration in which the brake fluid pressure is generated such that the brake pedal 43 causes the first and second pistons 34a, 34b of the master cylinder 32 to stroke, except that pneumatic pressure is used instead of stepping force applied by a driver. On this account, a master cylinder, a brake pedal, and so on to be used in a conventional and general manual driving vehicle can be used just as they are, for example. This is advantageous to restrain an increase in cost.

The present disclosure is not limited to the above embodiment and can be modified appropriately within the scope of Claims and within a scope equivalent thereto.

(1) The above embodiment deals with an example in which the brake actuator 20, the brake unit 30, and the brake pedal unit 40 are provided in the braking device 10. However, the present disclosure is not limited to this.

For example, one brake fluid pressure generation device may be used, provided that the brake fluid pressure generation device generates brake fluid pressure in accordance with strokes of pistons sliding in a cylinder housing, and the brake fluid pressure generation device is arranged in a storage chamber such that a sliding direction of the pistons is parallel to the vehicle width direction.

(2) The above embodiment deals with an example in which the brake pedal unit 40 is pneumatically actuated. However, the present disclosure is not limited to this.

For example, the brake pedal unit 40 may be hydraulically actuated or electrically actuated, provided that the brake fluid pressure can be generated by causing the first and second pistons 34a, 34b to stroke when the brake unit 30 is inoperable, for example.

(3) The above embodiment deals with an example in which the brake unit 30 and the brake pedal unit 40 are arrayed in the vehicle width direction, and the brake actuator 20 is arranged behind the brake unit 30 and the brake pedal unit 40 in the vehicle front-rear direction. However, the present disclosure is not limited to this. For example, the brake actuator 20, the brake unit 30, and the brake pedal unit 40 may be arrayed in the vehicle width direction.

(4) The above embodiment deals with (B-2) as a case where the brake pedal unit 40 is actuated. However, the present disclosure is not limited to this. For example, when the vehicle 1 is parked, the brake pedal unit 40 may be actuated as a parking brake.

(5) The above embodiment deals with an example in which three brake fluid pressure generation devices (20, 30, 40) and the air conditioner unit (the air-conditioning device) 53 are stored in the first storage chamber 5. However, the present disclosure is not limited to this. For example, the air conditioner unit 53 can be stored in the second storage chamber 7 instead of the first storage chamber 5.

(6) The above embodiment deals with an example in which the brake actuator 20, the brake unit 30, and the brake pedal unit 40 are stored in the first storage chamber 5. However, the present disclosure is not limited to this.

For example, although not illustrated herein, any two brake fluid pressure generation devices (20, 30), (20, 40), or (30, 40) out of the brake actuator 20, the brake unit 30, and the brake pedal unit 40 can be stored in the first storage chamber 5.

(7) The above embodiment deals with an example in which both the brake unit 30 and the brake pedal unit 40 use the master cylinder 32 in common. However, the present disclosure is not limited to this.

For example, although not illustrated herein, the brake unit 30 and the brake pedal unit 40 may be configured to include respective master cylinders 32.

(8) The above embodiment deals with an example in which the brake actuator 20, the brake unit 30, the brake pedal unit 40, and the air conditioner unit 53 (the air-conditioning device) are stored in the first storage chamber 5, and the electric drive motor 51 is stored in the second storage chamber 7. However, the present disclosure is not limited to this.

For example, although not illustrated herein, in a reverse manner to the above, the electric drive motor 51 can be stored in the first storage chamber 5, and the brake actuator 20, the brake unit 30, the brake pedal unit 40, and the air conditioner unit 53 (the air-conditioning device) can be stored in the second storage chamber 7.

(9) The above embodiment deals with an example in which the vehicle 1 employs a drive system in which the electric drive motor 51 inputs driving force into the rear wheels 3. However, the present disclosure is not limited to this.

For example, although not illustrated herein, in a case where such a configuration is employed that the electric drive motor 51 is stored in the first storage chamber 5, and the brake actuator 20, the brake unit 30, the brake pedal unit 40, and the air conditioner unit 53 (the air-conditioning device) are stored in the second storage chamber 7, the vehicle 1 may employ a drive system in which the electric drive motor 51 inputs driving force into the front wheels 2.

(10) In the above embodiment, it is not necessary to completely separate the first storage chamber 5 from the third storage chamber 6 and to completely separate the second storage chamber 7 from the third storage chamber 6. The first storage chamber 5 may communicate with the third storage chamber 6, and the second storage chamber 7 may communicate with the third storage chamber 6.

(11) The above embodiment deals with an example in which the present disclosure is applied to a vehicle in which no driver seat is provided, and automated driving is enabled. However, the present disclosure is not limited to this. Although not illustrated herein, the present disclosure is also applicable to a vehicle configured such that a driver seat is provided in a vehicle cabin.

(12) In the above embodiment, an auxiliary seat for an operator can be provided in the vehicle cabin 4.

Thus, the above embodiment is just an example in every respect and must not be interpreted restrictively. Further, modifications and alterations belonging to an equivalent range of Claims are all included in the present disclosure.

The present disclosure can contribute to the spread of a vehicle excellent in workability of maintenance of a brake fluid pressure generation device while the vehicle has as large a vehicle cabin as possible.

What is claimed is:

1. A vehicle comprising:
    a vehicle cabin;
    a storage chamber arranged on at least one side of the vehicle cabin in a vehicle front-rear direction; and
    a partition wall separating the storage chamber from the vehicle cabin, wherein
    the partition wall has an opening,
    the storage chamber communicates with the vehicle cabin via the opening,
    a cover configured to open and close the opening is provided over the opening,
    a first brake fluid pressure generation device included in a braking device for wheel braking is stored in the storage chamber,
    the first brake fluid pressure generation device includes a reservoir tank in which hydraulic fluid is accumulated, and
    the first brake fluid pressure generation device including the reservoir tank is arranged at a position facing the opening, so that when the cover is moved to open the opening, the reservoir tank is exposed to the vehicle cabin, wherein:
    the first brake fluid pressure generation device includes
    an actuator body portion configured to supply brake fluid pressure to a wheel brake unit, and
    an electric motor configured to pump the hydraulic fluid from the reservoir tank and supply the hydraulic fluid to the actuator body portion as the brake fluid pressure; and
    the actuator body portion and the electric motor are arranged at the position facing the opening.

2. The vehicle according to claim 1, wherein an array direction of the actuator body portion and the electric motor are parallel to a vehicle width direction.

3. The vehicle according to claim 1, wherein:
    the first brake fluid pressure generation device includes
        a master cylinder configured to generate the brake fluid pressure to be supplied to the wheel brake unit by causing a piston to stroke in a cylinder housing to which the hydraulic fluid in the reservoir tank is supplied, and
        a drive unit configured to cause the piston to stroke; and
    the master cylinder and the reservoir tank are arranged such that the master cylinder and the reservoir tank overlap each other in a vehicle side view.

4. The vehicle according to claim 3, wherein a longitudinal direction of the master cylinder is parallel to a vehicle width direction.

5. The vehicle according to claim 1, wherein, in the storage chamber, a second brake fluid pressure generation device is stored at the position facing the opening.

6. The vehicle according to claim 5, wherein:
    the second brake fluid pressure generation device includes a master cylinder configured to generate brake fluid pressure to be supplied to a wheel brake unit by causing a piston to stroke in a cylinder housing to which the hydraulic fluid in the reservoir tank is supplied, a pushing member configured to cause the piston of the master cylinder to stroke, and a drive unit configured to drive the pushing member; and the pushing member and the master cylinder are arranged in a vehicle width direction.

7. The vehicle according to claim 6, wherein the pushing member is arranged at a nearest position to the opening in the storage chamber.

8. The vehicle according to claim 1, wherein the cover is constituted by a part of trim components of the vehicle cabin.

9. The vehicle according to claim 8, wherein:

the trim component constituting the cover is an occupant seat; and the occupant seat is arranged so as to face a direction different from a direction where the vehicle travels forward.

10. The vehicle according to claim 9, wherein the direction different from the direction where the vehicle travels forward is rearward of the vehicle in the vehicle front-rear direction.

11. A vehicle comprising:

a vehicle cabin;

a storage chamber arranged on at least one side of the vehicle cabin in a vehicle front-rear direction; and a partition wall separating the storage chamber from the vehicle cabin, wherein the partition wall has an opening, the storage chamber communicates with the vehicle cabin via the opening, a cover configured to open and close the opening is provided over the opening, a first brake fluid pressure generation device included in a braking device for wheel braking is stored in the storage chamber, the first brake fluid pressure generation device includes a reservoir tank in which hydraulic fluid is accumulated, and the first brake fluid pressure generation device including the reservoir tank is arranged at a position facing the opening, so that when the cover is moved to open the opening, the reservoir tank is exposed to the vehicle cabin, wherein:

an air-conditioning device is further stored in the storage chamber; and the first brake fluid pressure generation device is arranged at a position closer to the opening than the air-conditioning device.

12. A vehicle comprising:

a vehicle cabin;

a storage chamber arranged on at least one side of the vehicle cabin in a vehicle front-rear direction; and a partition wall separating the storage chamber from the vehicle cabin, wherein the partition wall has an opening, the storage chamber communicates with the vehicle cabin via the opening, a cover configured to open and close the opening is provided over the opening, a first brake fluid pressure generation device included in a braking device for wheel braking is stored in the storage chamber, the first brake fluid pressure generation device includes a reservoir tank in which hydraulic fluid is accumulated, the first brake fluid pressure generation device including the reservoir tank is arranged at a position facing the opening wherein, in the storage chamber, a second brake fluid pressure generation device is stored at the position facing the opening, in the storage chamber, a second brake fluid pressure generation device is stored at the position facing the opening, the second brake fluid pressure generation device includes:

a master cylinder configured to generate brake fluid pressure to be supplied to a wheel brake unit by causing a piston to stroke in a cylinder housing to which the hydraulic fluid in the reservoir tank is supplied, a pushing member configured to cause the piston of the master cylinder to stroke, and a drive unit configured to drive the pushing member; and the pushing member and the master cylinder are arranged in a vehicle width direction.

* * * * *